United States Patent [19]
Fentress

[11] Patent Number: 5,721,799
[45] Date of Patent: Feb. 24, 1998

[54] METHOD AND APPARATUS FOR INSTALLING A FIBER OPTIC CABLE BY CAPTURE OF AN OUTER HOUSING

[76] Inventor: Vernon A. Fentress, 10 Marjorie Rd., Burlington, Mass. 01803

[21] Appl. No.: 489,337

[22] Filed: Jun. 12, 1995

[51] Int. Cl.[6] .................................................. C02B 6/38
[52] U.S. Cl. .................................. 385/77; 385/66; 385/72
[58] Field of Search ............................ 385/77, 86, 72, 385/66, 60

[56] References Cited

U.S. PATENT DOCUMENTS

| | | | |
|---|---|---|---|
| 5,125,057 | 6/1992 | Aberson, Jr. et al. | 385/66 |
| 5,134,678 | 7/1992 | Essert | 385/86 |
| 5,187,768 | 2/1993 | Ott et al. | 385/72 |

*Primary Examiner*—John Ngo

[57] ABSTRACT

Providing a simplified universal connector body. The new design providing significant more protection for the precision tip, and fiber optic cable than the previous design by completely enclosing all parts in a housing closed by a door, which can be removed for inspection. The sturdy crimp approach is retained allowing the design to survive significant abuse. Providing an improved ST outer housing. The new design eliminates the intricated jaw-hold-out in favor of a normally closed jaw that opens upon insertion onto the ST coupling. The jaw clamps is replaced by a jaw release. The new design is simpler and significantly more durable. Providing a new outer housing which enable the universal connector body to mate with the JR-type connector. This new design allows a one for one replacement of RJ-type copper connections with fiber optic connections on patch panels and electronic equipment.

2 Claims, 4 Drawing Sheets

METHOD AND APPARATUS FOR INSTALLING A FIBER OPTIC CABLE BY CAPTURE OF AN OUTER HOUSING

TECHNICAL FIELD

This invention relates to improved methods and apparatus for installing preconnectorized fiber optic cables. More particularly, the invention relates to novel connectors and coupling assemblies which allow factory termination of fiber optic cable assemblies and ease of field installation. These novel connectors and coupling assemblies also allow coupling and decoupling of these preconnectorized fiber optic cables to other fiber optic cables, or to light sources or detectors, by simple operations.

BACKGROUND ART

Typically, fiber optic cables installed in local area networks (LANs) are housed in conduits and connected with dematable connectors. The benefits of fiber optics for use in these LANs are many. However, the primary benefit lies in the ability to send the information of many telecommunication instruments over an exceedingly small number of channels as compared to conventional copper cables. A single pair of optical fibers may, in fact, replace several hundred pairs of copper cables.

Because of the present tendency toward high capacity small cables, fiber optic cables are often installable where conventional copper or coaxial cables of equivalent capacity will not fit, e.g., small or congested cable ducts. Copper or coaxial cable bundles as large as 100 mm in diameter can be avoided in favor of fiber optic cables as small as 3 mm in diameter.

Unfortunately, single channel dematable fiber optic connectors used to terminate the cable are typically several times larger in diameter than the fiber optic cable terminated. This results in connector bundle sizes several times the diameter of multi-channel fiber optic cable. These connector bundles are fragile and do not fit through standard communications ducts. This situation has almost universally resulted in field connectorization as opposed to the more desirable factory connectorization of LAN fiber optic cables.

In a previous U.S. Pat. No. 5,253,315, the author addresses the issue by providing for coupling device (outer housing) installation after cable installation. The outer housing is installed onto a small diameter, preconnectorized universal connector body, after the universal connector body cable assembly has been pulled into the communications duct. U.S. Pat. No. 5,253,315 provides for a universal connector body and an ST outer housing design as well. The apparatus and method described herein results in a significantly improved universal connector body and ST outer housing designs as well as a unique RJ-type outer housing design.

SUMMARY OF THE INVENTION

According to one aspect of the present invention, there is provided a simplification of the universal connector body of U.S. Pat. No. 5,253,315. The new design provides significantly more protection for the precision tip, and fiber optic cable than the previous design by completely enclosing all parts in a housing closed by a door, which can be removed for inspection. The sturdy crimp approach is retained allowing the design to survive significant abuse.

According to another aspect of the present invention, there is provided an improvement of the ST outer, housing of U.S. Pat. No. 5,253,315. The new design eliminates the intricate jaw-hold-out in favor of a normally closed jaw that opens upon insertion onto the ST coupling. The jaw clamp is replaced by a jaw release. The new design is simpler and significantly more durable.

According to a third aspect of the present invention, there is provided a new outer housing which enables the universal connector body to mate with the RJ-type of connector. This new approach significantly reduces the patch-panel and printed circuit board space required to accommodate fiber optic terminations. This new design allows a one for one replacement of RJ-type copper connections with fiber optic connections on patch panels and electronic equipment.

BRIEF DESCRIPTION OF THE DRAWINGS

FIG. 3 also shows a partial cut-away view of the ST outer housing revealing parts needed to mate with the ST coupling.

FIG. 3 also shows a plan-view of the male RJ-11 and RJ45-type outer housings revealing parts needed to mate with the universal connector body.

BEST MODE FOR CARRYING OUT THE INVENTION

Figure 1:
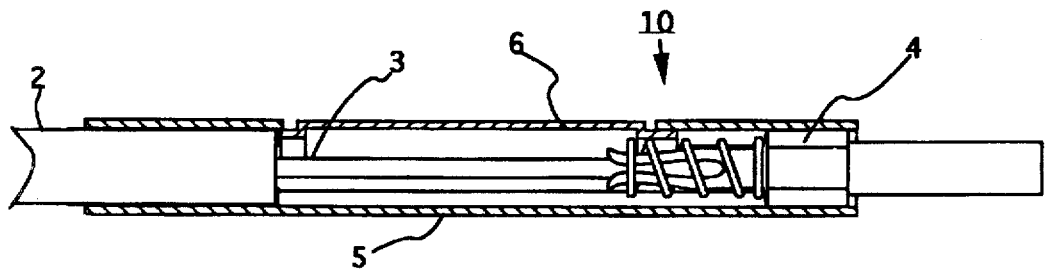
FIG. 1 is a cross-section of the universal connector body for one embodiment of the invention.
Figure 2:
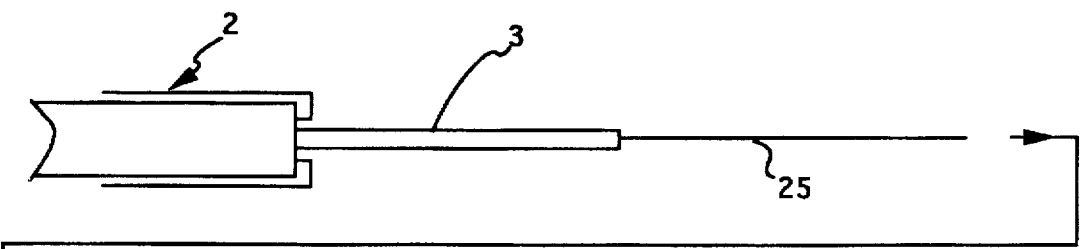
FIG. 2 shows the assembly procedure for the universal connector body.
Figure 2:
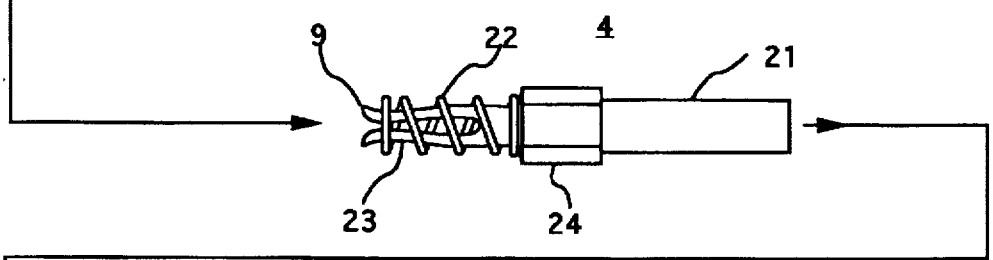
Figure 2:
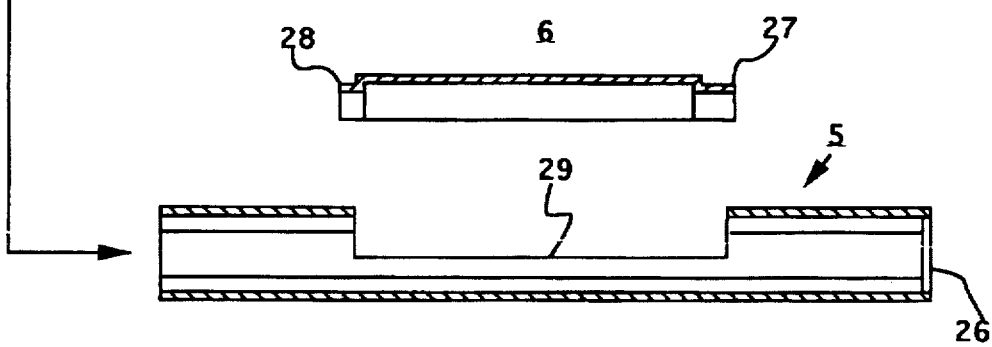

Reference is made to FIGS. 1, and 2 of the drawings. FIG. 1 shows the universal connector body 10 terminated to an optical fiber cable 2. The optical fiber cable is of a known construction having the cable jacket cut back to expose a buffered optical fiber 3 surrounded by an aramid yarn strength member. The spring tip 4 is terminated to the buffered optical fiber 3 and is retained within the accumulator/crimp sleeve 5 by the accumulator/crimp sleeve door 6, which compresses the spring of the spring tip 4 enabling it to adjust its position within the accumulator/crimp sleeve when the universal connector body is mated to another connector.

Referring to FIG. 2 which shows the procedure for assembly of universal connector body 10. The universal connector body 10 is composed of spring tip 4, accumulator/crimp sleeve 5, and accumulator/crimp sleeve door 6.

FIG. 2 also shows the details, of the spring tip 4 of the universal connector body 10, which is composed of a precision tip 21, for centering and securing the fiber of fiber optic cable 2 and mating that fiber to other fibers or communications devices, a spring tip spring 22 for providing a force to maintain the precision tip and mated connectors in contact, spring tip fork 23 which aids in holding the spring tip securely on the buffered fiber during the assembly and epoxy cure procedure, and outer tube 24. The tips 9 of the spring tip fork 23 also aids in holding the spring tip spring on the spring tip fork during the assembly and epoxy cure procedure. The precision tip 21 is secured to the outer tube 24 which is secured to the spring tip fork 23.

FIG. 2 shows the procedure for assembling the universal connector body. The spring tip 4 is installed over the fiber 25 and the buffered fiber 3 by inserting these through the jaws of the spring tip fork 23 as shown. The internal opening in the jaws of the spring tip fork 23 is slightly smaller than the outer diameter of the buffered fiber allowing the spring tip fork to hold the spring tip assembly in place during the process of securing the spring tip to the optical fiber and buffer.

The external diameter of the fork tips 9 of the spring tip fork 23 is slightly larger than the inner diameter of the spring tip spring 22 allowing the spring tip fork 23 to hold the spring tip spring 22 in place on the spring tip fork 23 during the process of securing the spring tip to the optical fiber and buffer.

The assembly consisting of the spring tip 4, secured to the optical fiber cable 2, is inserted into the accumulator/crimp sleeve 5 until the outer tube 24 rests against the shoulder 26 of the accumulator/crimp sleeve 5. After the accumulator/ crimp sleeve is securely attached to the cable, the accumulator/crimp sleeve door 6 is then inserted into the opening 29 of the accumulator/crimp sleeve 5 with the long flange 27 of the accumulator/crimp sleeve door 6 resting against the end of the spring tip spring 22. Finally, the accumulator/crimp sleeve door 6 is pushed against the spring tip spring 22 until the spring tip spring 22 is compressed enough to allow insertion of the short flange 28 into the other end of the opening 29 of the accumulator/crimp sleeve 5. The unique design of the accumulator/crimp sleeve and door allows the compression of the spring tip spring, enabling it to maintain mating pressure on the ferrule and close the universal connector body assembly simultaneously and without the use of tools. This assembly can be opened and re-closed at any time for inspection without risking damage to the optical fiber.

Figure 3:
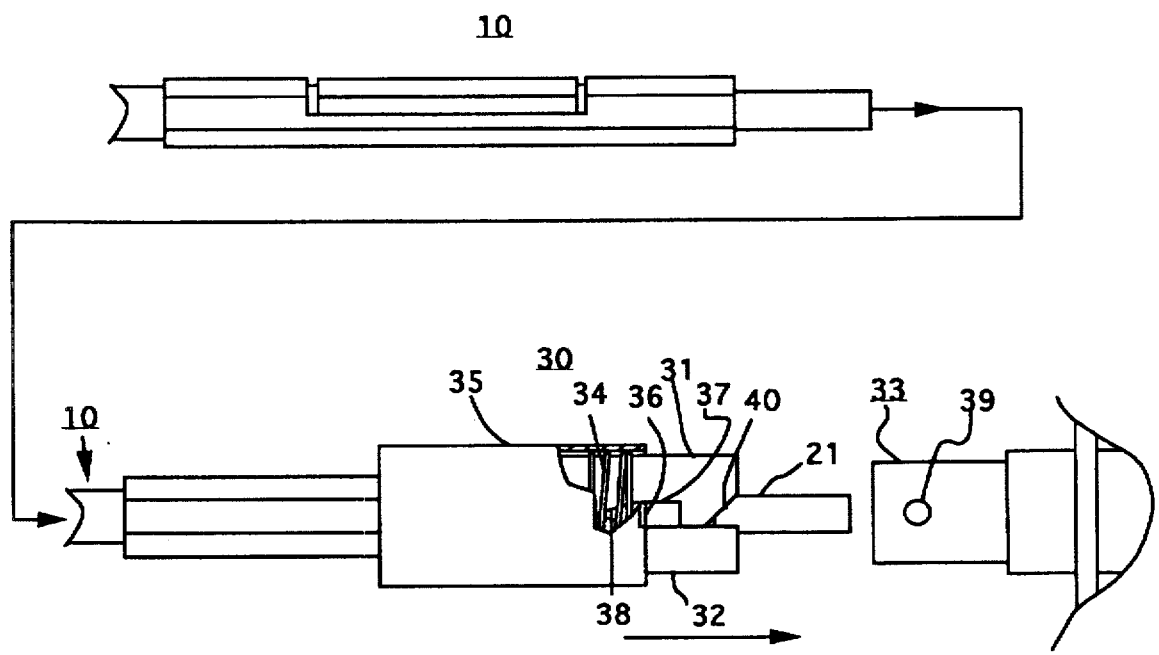
FIG. 3 shows the procedure for inserting the universal connector body into the ST outer housing.

In another embodiment of the present invention reference is made to FIG. 3 which shows the improved ST outer housing 30. This outer housing accepts the universal connector body 10 as shown. The improved ST outer housing 30 is composed of the connecting jaw, which opens into two halves, an upper connecting jaw 31, which engages and grips the standard ST coupling 33, with coupling boss 39 and the lower connecting jaw 32, which aids the upper connecting jaw 31 in its gripping action. Upper connecting jaw 31 has a coupling boss ramp 40, an opening 37, and a jaw tab ramp 38. The jaw spring 34, which keeps the connecting jaws normally closed, is distributed about the outer circumference of the connecting jaws. The jaw release 35 is, in turn, distributed about the outer circumference of the jaw spring 34. The jaw release 35 has a jaw tab 36 which extends inward between the upper connecting jaw 31 and the lower connecting jaw 32.

Figure 4:
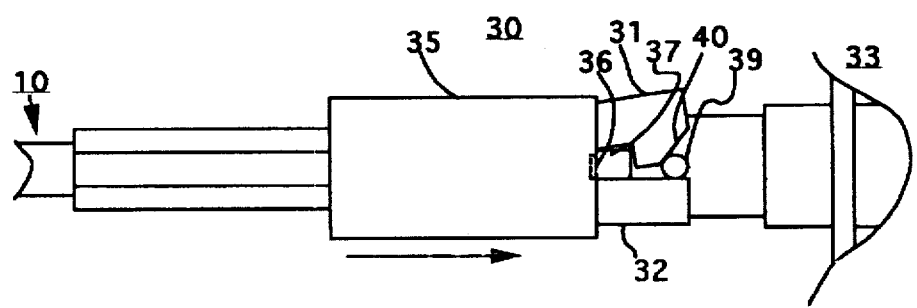
FIG. 4 shows the ST outer housing in the initial process of mating with the ST coupling.

Referring to FIGS. 3, 4, 5, and 6 the improved ST outer housing operates as follows: FIGS. 3 shows the improved ST outer housing in an uncoupled condition. In this condition the jaw spring holds the jaws 31 and 32 in the closed position. FIG. 3 shows the improved ST outer housing, with the universal connector body 10 inserted, being pushed toward the ST coupling 33, which is used to couple the improved ST outer housing to another fiber optic device. FIG. 4 shows the improved ST outer housing as it contacts the ST coupling 33. In this position, the coupling boss 39 contacts the coupling boss ramp 40 of the upper connecting jaw 31 forcing the upper connecting jaw 31 open as shown.

Figure 5:
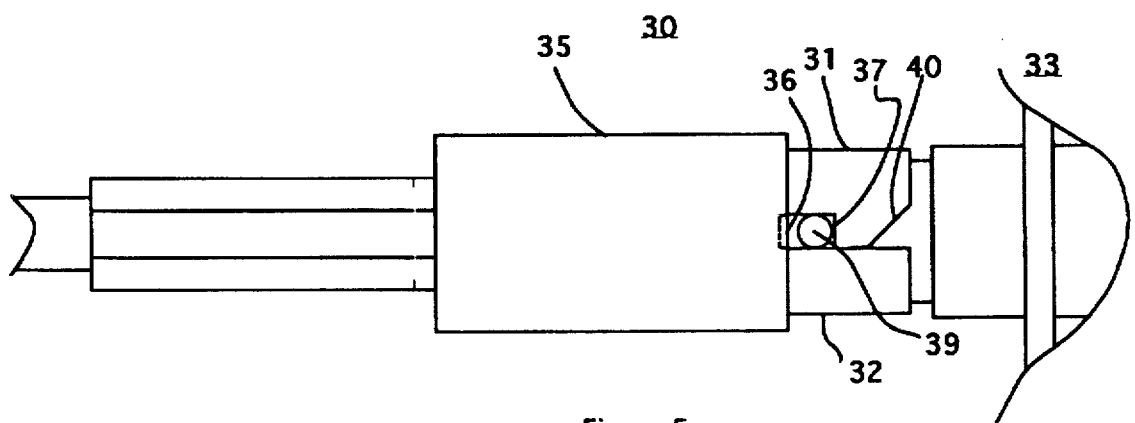
FIG. 5 shows the ST outer housing in mated condition with the ST coupling.

Referring to FIG. 5, continued pushing of the improved ST outer housing 30 toward the ST coupling 33 causes the coupling boss 39 to continue to advance along the coupling boss ramp 40 of the upper connecting jaw 31 continuing to force the upper connecting jaw 31 open until the coupling boss 39 enters the opening 37 of the upper connecting jaw 31. At this point, the jaw spring 34 closes the upper connecting jaw 31 securely capturing the coupling boss 39 in the opening 37 of the upper connecting jaw 31 as shown in FIG. 5.

Figure 6:
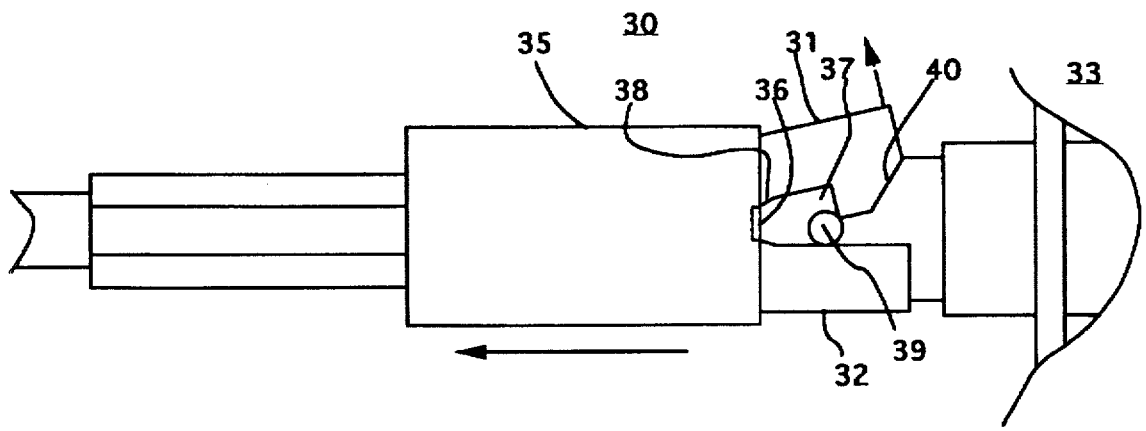
FIG. 6 shows the ST outer housing in the process of demating with the ST coupling.

Referring to FIG. 6, which shows the procedure for releasing the ST coupling 33 from the improved ST outer housing 30, pulling the jaw release 35 causes the jaw tab 36, which extends inward between the upper connecting jaw 31 and the lower connecting jaw 32, to contact the jaw tab ramp 38 of the upper connecting jaw 31. Continued pulling of the jaw release 35 causes the jaw tab 36 to continue to advance along the jaw tab ramp 38 of the upper connecting jaw 31 forcing the upper connecting jaw 31 open until the coupling boss 39 is released.

Figure 7:
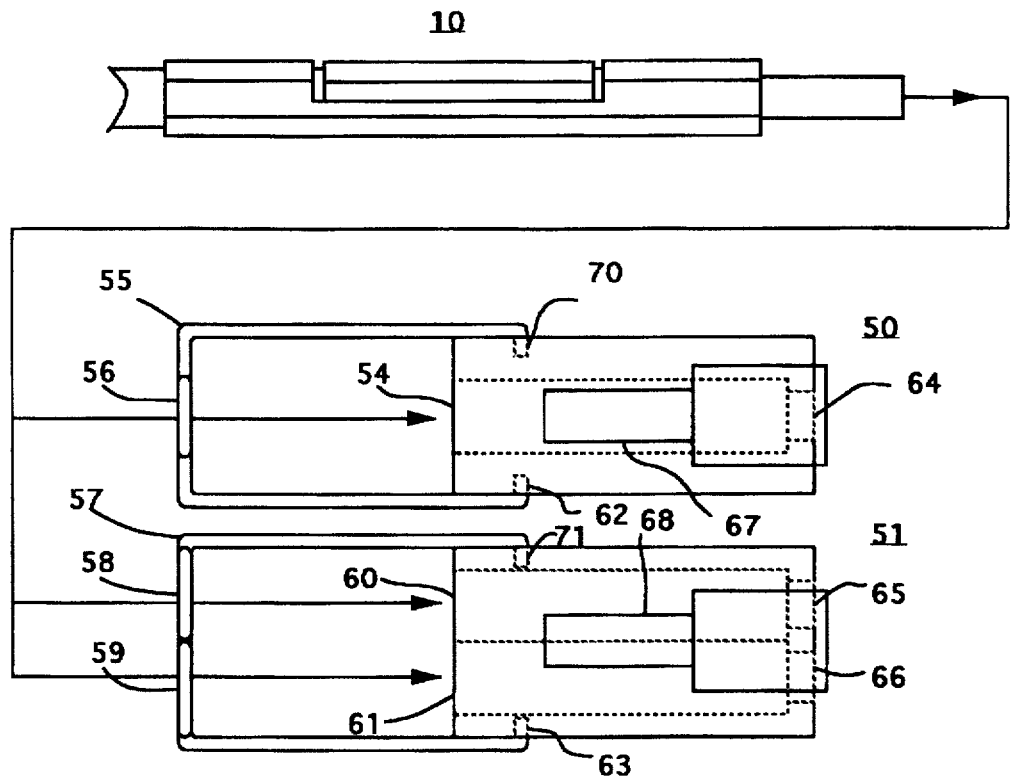
FIG. 7 shows the procedure for inserting the universal connector body into the male RJ-type outer housing.
Figure 8:
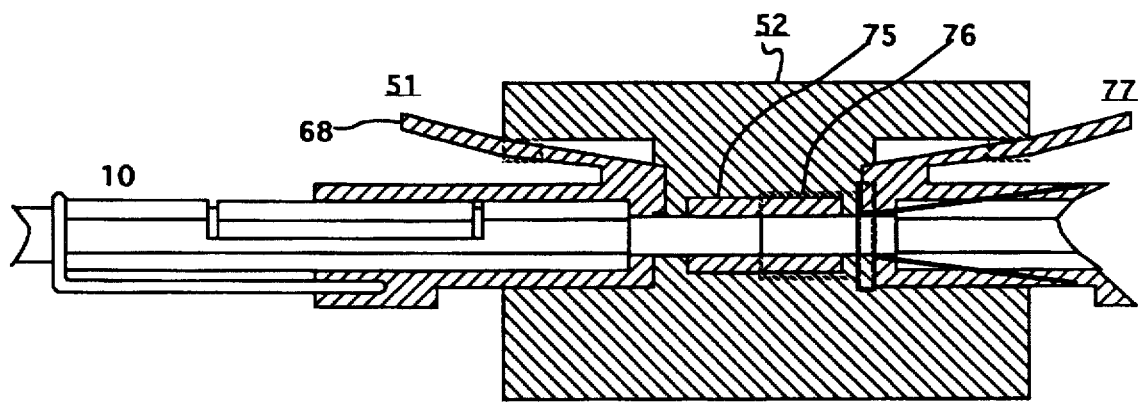
FIG. 8 shows the universal connector body inserted into the RJ-type outer housing mated with a female RJ-type coupling provided with a fiber optic coupling sleeve.

In still another embodiment of the present invention, reference is made to FIGS. 7 and 8 of the drawings which show a new outer housing design enabling the connection of the universal connector body to communication systems accommodating standard RJ-type connections.

FIG. 7 shows how male RJ-type connectors can be modified to act as outer housings for the universal connector body 10. The universal connector body 10 is shown being inserted into a male RJ-11 type connector 50 modified to accept a single universal connector body 10 and an RJ-45 type connector 51 modified to accept two universal connector bodies. The modification of the RJ-11 connector is accomplished by drilling or otherwise providing a clearance hole 54 into which the universal connector body 10 can be inserted. A clearance hole 64 is provided for the precision ferrule 21. To retain the universal connector body 10 in the RJ-11, a wire retainer 55 is provided with a loop 56 to provide access for the optical fiber cable 2. The wire retainer 55 is attached by providing retaining holes 70 and 62 into which the wire retainer 55 is inserted.

The modification of the male RJ-45 connector is accomplished by drilling or otherwise providing clearance holes 60 and 61 into which the universal connector body 10 can be inserted. Clearance holes 65 and 66 are provided for the precision ferrule 21. To retain the universal connector body 10 in the RJ-45, a wire retainer 57 is provided with loops 58 and 59 to provide access for the optical fiber cable 2. The wire retainer 57 is attached by providing retaining holes 71 and 63 into which the wire retainer 57 is inserted. This arrangement allows the universal connector body 10 to be inserted and removed at any time to be used with other outer housings.

FIG. 8 shows a side view of modified RJ-45 connectors 51 and 77 acting as outer housings for the universal connector body 10. The modified RJ-45 connectors 51 acting as outer housings for the universal connector body 10 are shown inserted into a female RJ-45 type connector 50 modified to include a connection sleeve 75 to enable mating of universal connector body 10 with other connectors and communications devices such as the modified RJ-45 type connector 77 shown and the transmitter/receiver diode 76 shown in dotted lines.

It should be further understood that the applicant has disclosed and described the invention making reference only to certain preferred embodiments of the invention and the best modes for carrying out the invention which are now known to applicant. However, the applicant contemplates that there may be various other adaptations and alterations for the method and apparatus disclosed herein and claimed. Thus, the applicant intends that all such adaptations and variations are all within the spirit of this invention and the appended claims.

I claim:

1. An RJ-type connector provided with means for connecting one or more fiber optic cables to other fiber optic cable or cables or other optical communications devices, said means for connecting one or more fiber optic cables to other fiber optic cable or cables or other optical communications devices being a universal connector body, wherein said universal connector body means comprises:

clearance holes in a male RJ-type connector into which the universal connector body can be inserted, clearance holes in a male RJ-type connector into which a precision ferrule can be inserted, a wire retainer to retain the universal connector body in said male RJ-type connector, connecting sleeve means in a female RJ connector for mating the precision ferrule of the universal connector body to other optical communications devices.

2. The apparatus of claim 1, wherein said wire retainer comprises:

retaining holes into which the wire retainer is inserted, loops to provide access for the optical fiber cable, removal means to allow the universal connector body to be inserted and removed at any time.

* * * * *